United States Patent [19]
Aron

[11] 3,983,961
[45] Oct. 5, 1976

[54] TRANSDUCER FOR SERVOMECHANISMS
[75] Inventor: David James Aron, Mosman, Australia
[73] Assignee: Elevators Pty. Limited, Waterloo, Australia
[22] Filed: Sept. 27, 1973
[21] Appl. No.: 401,470

[30] Foreign Application Priority Data
Feb. 21, 1973 Australia............................ 2354/73

[52] U.S. Cl............................................. 187/29 R
[51] Int. Cl.² .......................................... B66B 1/40
[58] Field of Search ...................................... 187/29

[56] References Cited
UNITED STATES PATENTS
| | | | |
|---|---|---|---|
| 2,210,695 | 8/1940 | Wagner.................................. | 187/29 |
| 3,207,265 | 9/1965 | Lund et al. ............................ | 187/29 |
| 3,749,203 | 7/1973 | Hoelscher............................. | 187/29 |

Primary Examiner—Robert K. Schaefer
Assistant Examiner—W. E. Duncanson, Jr.
Attorney, Agent, or Firm—Ladas, Parry, Von Gehr, Goldsmith & Deschamps

[57] ABSTRACT

A floor-levelling transducer for controlling stopping of an elevator car at a landing, comprising two pairs of electromagnetic core units mounted on the car to generate a signal indicative of the position of the car with respect to the landing, and two metal plates in the shaft corresponding to each landing position and cooperable with the core units to produce said signal, each of the metal plates being flat and in separate parallel planes extending longitudinally of the shaft and having tapering portions pointing in a direction opposite to that of the other plate.

6 Claims, 5 Drawing Figures

TRANSDUCER FOR SERVOMECHANISMS

This invention relates to improvements in transducers of a type suitable for use in servomechanisms which provide for controlled stopping at one or more positions of the movement of a body along a predetermined path.

Although the invention may be applied to many forms of such servomechanisms, it is particularly suitable for elevator drive systems in which the speed of an elevator car is controlled by a regulator in which the actual speed of the car is compared with a reference speed pattern.

The reference pattern itself may be produced in a number of ways, but in one system incorporating this invention, the reference pattern, in a zone which may extend approximately 10 inches above and below any floor at which the lift car is required to stop, is generated by what is termed a floor-levelling transducer. This floor-levelling transducer consists of two identical transformers, mounted on the elevator car and electrically connected in such a way that as they pass specially-shaped and positioned magnetic plates in the shaft, known as transducer plates, a reference pattern represented by a suitably-shaped voltage is produced.

In an elevator drive system employing such apparatus, the output from the floor-levelling transducer normally becomes the operative reference speed pattern when the car is approximately 10 inches away from the floor at which it has to stop. Consequently from this point, the reference pattern is a precise function of the distance at any moment between the car and its stopping point. This enables the car to be brought to a stop quickly and accurately at floor level.

Moreover, while the elevator car is standing at floor level with its doors open, the loading and unloading of passengers and/or goods into and out of the car can cause the level of the car to vary slightly from floor level, due to the elasticity of the ropes by which the elevator car is suspended. In these circumstances, if a predetermined amount of error in floor level appears, it is possible to make the driving servomechanism move the car back to floor level by means of the reference pattern from the floor-levelling transducer.

Apparatus for such a floor-levelling transducer and transducer plates is disclosed in U.S. Pat. No. 3,207,265, issued on Sept. 21, 1965, and also in Canadian Patent No. 731,798, issued on Apr. 5, 1966. The apparatus there disclosed, consists of a specially-shaped magnetic plate for each floor served by the elevator car, and a pair of spaced electromagnetic units carried by the car. These specially-shaped magnetic plates are specified as being either generally hour-glass shaped or generally diamond shaped. In practice such plates are about 45 inches or 20 inches long respectively, which makes them very easily damaged during installation or service; this is particularly so with the hour-glass-shaped plates.

Another disadvantage of such long transducer plates is that extreme care must be exercised in their mounting so that they are positioned parallel to the direction of travel of the car, in order that adequate clearance will be maintained between each transducer plate and the travelling electromagnetic units.

The two electromagnetic units carried on the car are, in the prior disclosure spaced vertically one above the other, or in the direction of travel of the car. Consequently they are in practice spaced about 20 inches (50.8 cm) apart. These two electromagnetic units necessarily have heavy iron cores, and are thus subjected to inertia loading during acceleration and deceleration of the lift car, as well as varying electromagnetic forces when passing transducer plates. Consequently they need rigid bracing to maintain them in their correct positions.

A further disadvantage of the previously disclosed arrangement is that the output of the two electromagnetic units can be undesirably affected by magnetic materials in the structure of the building, in brackets holding equipment in the elevator shaft, and by any other magnetic materials in the vicinity of either electromagnetic unit. Such undesirable effects are most serious when the car is at or near floor level, and they are invariably the result of extraneous magnetic materials influencing the output of one electromagnetic device more than the other.

Furthermore in this arrangement the two transformer units are spaced approximately 20 inches apart in a vertical plane. Consequently, if the elevator car on top of which they are mounted should tilt due to movement of passengers to one side of the car, or for any other reason, the transducer plate will penetrate further into one transformer unit than the other. This introduces an error into the output of the transducer. Also, this is the kind of error that can readily occur while an elevator car is standing at floor level with its doors open and passengers are entering and/or leaving the car. Spurious re-levelling of the car under such conditions is very undesirable.

It is the main object of the invention to provide a floor-levelling transducer which substantially avoids at least some of the above defects.

In one general form of the invention there is provided a transducer for a servomechanism providing for controlled stopping at a prearranged position of the movement of a body along a predetermined path, said transducer comprising two relatively movable parts and means for generating a signal having at least one parameter indicative of the relative position of the parts, said parts being mounted on the body and with respect to the path, respectively, one of said parts including two transducer plate sections mounted in spaced planes extending longitudinally of said path, and the other of said parts including transducing units cooperable with the plate sections to produce said signal.

The invention will be better understood from the following description taken in conjunction with the accompanying drawings, in which.

Figure 1:
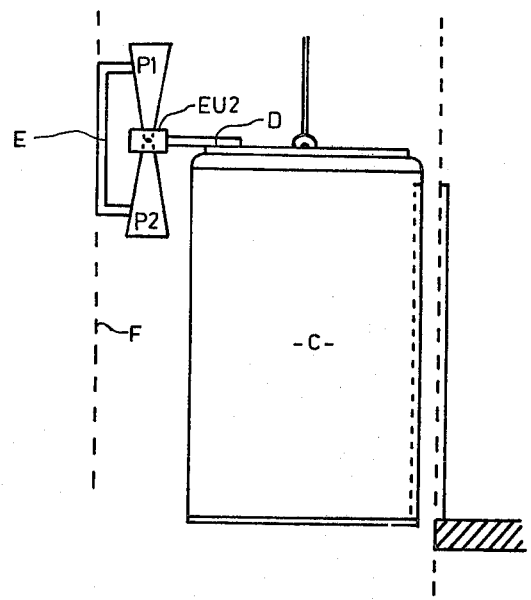
FIG. 1 is a schematic view in side elevation of an elevator car in its shaft, showing a transducer including a transducer plate arranged according to a first embodiment of the invention.

Two different types of transducer plates are shown in the drawings, one consisting of two substantially nonoverlapping identical triangular-shaped sections and the other consisting of two confronting sections each of which is shaped generally in the form of a triangle subtended on a slightly wider rectangular base B to form shoulders S. In each case the two sections of the transducer plate assembly point in opposite directions, and they are in parallel spaced planes to pass through the two halves of transducing units EU1 and EU2, which are arranged side by side substantially in a horizontal plane.

In practice, the two halves of each transducing unit EU1 and EU2 are preferably supported from the roof of the elevator car C by suitable brackets of which bracket D is an example. For clarity only the magnetic core halves of the transducing units EU1 and EU2 are shown but at least one half of each will be provided with an induction coil. The core halves have confronting pole faces G between which the transducer plates are arranged to pass. The transducer plates P1 and P2 are fixed to a non-magnetic bracket E secured to the shaft wall F.

By so positioning these two electromagnetic units the following benefits accrue:

a. Instead of having to attempt to keep extraneous magnetic materials clear of two separate electromagnetic units spaced about 20 inches apart vertically, it becomes necessary only to keep such extraneous magnetic materials clear of the one horizontal band in which both electromagnetic units are located when the car is at floor level; this is simpler in practice.

b. It is not possible in practice to remove all extraneous magnetic materials from the zones of influence of both electromagnetic units, but if these electromagnetic units are close to each other then they are more equally affected, and the distortion of their outputs tends to cancel out in the summed output of the transducer itself.

Figure 5:
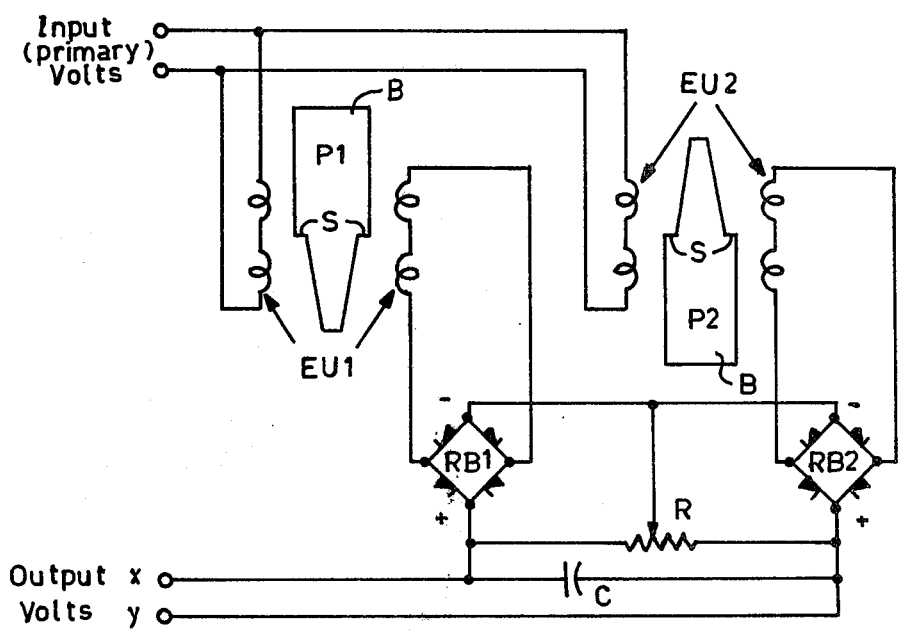

Assume that the car is approaching from below a floor at which it is required to stop, and that the primary windings of the transducing units EU1 and EU2 (FIG. 5) are energised. When the units EU 1 and EU 2 are both displaced downwardly from the transducer plate sections, maximum voltage is induced in each of the secondary windings. The two output voltages therefrom are opposed to each other in a summing circuit comprising rectifier bridges RB 1 and RB 2 and potentiometer R and capacitor C, so that the output of the transducer is approximately zero.

When the car ascends to a point about 10 inches below the floor, the output of unit EU 1 is suddenly reduced to a minimum by the intrusion of plate section P 1, so that the output of the transducer swings to a maximum value. The polarity of this output will be such that terminal Y becomes positive with respect to terminal X. This polarity corresponds to a pattern signal for upward travel of the elevator car.

Figure 2:
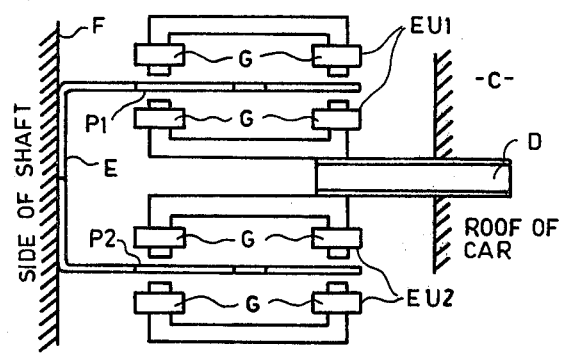
FIG. 2 is a plan view of the transducer including a transducer plate shown in FIG. 1.
Figure 3:
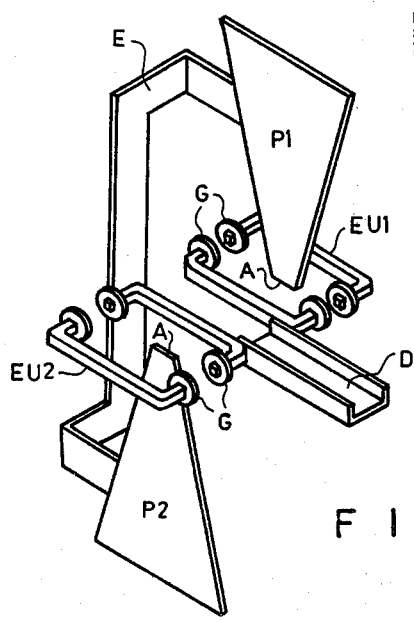
FIG. 3 is an isometric view of the transducer including a transducer plate of this first embodiment.
Figure 4:
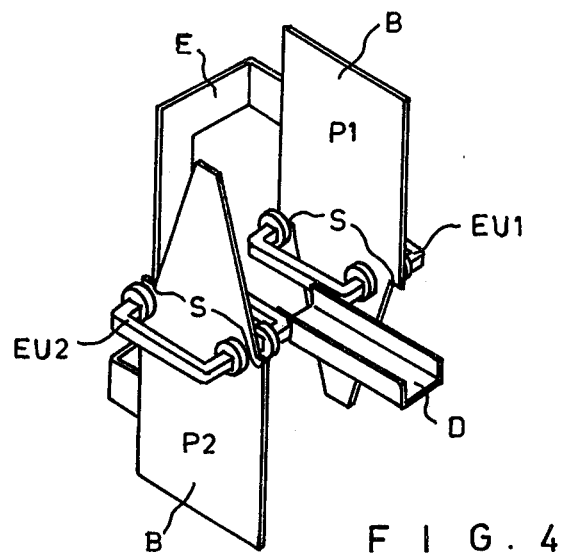
FIG. 4 is an isometric view of a transducer including a transducer plate constructed according to a second embodiment; and, FIG. 5 is a schematic view of one typical form of control circuit embodying the transducer of FIG. 4 but equally suitable for use with that of the first embodiment.

As the car ascends further the electrical conditions vary corresponding to a pattern and according to which type of transducer plate is used. In the case of the embodiment of FIGS. 1 to 3, the output of unit EU 1 progressively increases to a near maximum value, while the output of unit EU 2 remains at its maximum value. Where the embodiment of FIG. 4 is in use, however, the output of unit EU 1 remains at a minimum value, while the output of unit EU 2 drops progressively towards its minimum value. In either case the output of the transducer drops (that is, terminal Y becomes less positive with respect to terminal X) as the car ascends from about 10 inches to about ½ inch below floor. When the car comes exactly to floor level, in the case of both embodiments, the output of the transducer is zero, i.e. terminal Y is at the same voltage as terminal X. It should be noted, however, that in the case of the first embodiment, this zero output is the result of the balancing of two near-maximum outputs; while in the case of the second embodiment it is the result of the balancing of two near-minimum outputs.

If the car should for any reason ascend past the floor at which it should stop, then in the case of either transducer plate the output of the transducer will reverse, i.e. the terminal Y will become negative with respect to terminal X. This gives a downward-travelling pattern signal, the amplitude of which increases as a function of the distance the car has travelled above floor level.

It is desirable to provide a relatively steep output-voltage-versus-floor-distance relationship around floor level to facilitate precise levelling of the elevator car. This is achieved by the shaping of the individual plate sections P 1 and P 2, of the first embodiment, i.e. by the amount of truncation of their apexes A and the amount of their overlap, or, in the case of the second embodiment by the width of the shoulders S.

In practice when the elevator car stops at a floor, it will stop very slightly high or low of floor level if the total weight of the car plus its payload is less than or greater than the weight of its counterweight. Thus the transducer can generate a small output to cause the hoist motor to sustain the out-of-balance loading.

It should be appreciated from the foregoing description that what the invention has achieved in substance over the prior art is by separating the two opposed hitherto in-line sections of the transducer plates into parallel spaced alignment, to permit the transducing units to be brought close together for compactness of mounting and other attendant advantages. Compactness in itself is of value not only in installation in confined elevator shafts but also for maintenance purposes.

Whereas two embodiments have now been described it should be understood that other forms, modifications and refinements are feasible within the scope of the invention. For example, disposition of the transducer plate sections in other than parallel planes is possible providing that they are maintained upright. Furthermore, although the transducing units EU 1 and EU 2 are shown as separate transformers and preferably have their secondaries furthest apart they may be arranged so that (A) they have a common iron core, (B) a single primary winding, (C) a single secondary winding, or (D) locate the primaries on the remote sides of the cores of the units EU 1 and EU 2.

What I claim is:

1. An improved transducer for a servomechanism providing for controlled stopping at a prearranged position of the movement of a body along a predetermined path, said transducer comprising two relatively movable parts and means for generating a signal having at least one parameter indicative of the relative position of the parts, said parts being mounted on the body and with respect to the path, respectively, wherein the improvement comprises a. one of said parts includes transducing electromagnetic units having magnetic cores, and b. the other of said parts includes transducer metal plate sections for cooperation with the fields of said electromagnetic units to produce said signal, said metal plate sections having tapered edge portions and being mounted at confronting positions in spaced parallel planes extending longitudinally of said path.

2. A transducer according to claim 1, wherein the transducing electromagnetic units are fixedly mounted on the body and the transducer plate sections are fixedly mounted with respect to said path.

3. A transducer according to claim 1, wherein the transducer plate sections are identical flat metal plates each having a triangular portion on a rectangular shaped base portion with the triangular portions of both plates facing in opposite directions.

4. A transducer according to claim 3, wherein the base portion is wider than the base of the triangular portion to form shoulders at opposite sides of the triangle base.

5. A floor-levelling transducer for a control unit of an elevator system to control stopping of a car at any one of a plurality of landings in a shaft, said transducer comprising a pair of flat metal plates at confronting positions in parallel spaced planes extending longitudinally of the shaft and fixed in the shaft at positions corresponding to each landing and each having a tapering portion facing in an opposite direction to the tapering portion of the other metal plate, two electromagnetic transducer units fixedly mounted on the car and each having two magnetic core parts between which a respective one of the metal plates passes during passage of the car along the shaft to change the magnetic flux in the core parts, and electric coil means on the core parts to derive a signal indicative of the position of the metal plates relative to the core parts.

6. A floor-levelling transducer according to claim 5, wherein the pair of metal plates are shaped with triangular peaks on rectangular base portions.

* * * * *